United States Patent
Kumar et al.

(10) Patent No.: US 11,008,262 B2
(45) Date of Patent: May 18, 2021

(54) HARDENING ACCELERATION/HARDENING RETARDATION COMPOSITION FOR BUILDING MATERIALS

(71) Applicant: ECOLE POLYTECHNIQUE FEDERALE DE LAUSANNE (EPFL), Lausanne (CH)

(72) Inventors: Abhishek Kumar, Renens (CH); Paul Bowen, Bern (CH)

(73) Assignee: ECOLE POLYTECHNIQUE FÉDÉRALE DE LAUSANNE (EPFL), Lausanne (CH)

( * ) Notice: Subject to any disclaimer, the term of this patent is extended or adjusted under 35 U.S.C. 154(b) by 65 days.

(21) Appl. No.: 16/318,307

(22) PCT Filed: Jul. 12, 2017

(86) PCT No.: PCT/IB2017/054189
§ 371 (c)(1),
(2) Date: Jan. 16, 2019

(87) PCT Pub. No.: WO2018/015841
PCT Pub. Date: Jan. 25, 2018

(65) Prior Publication Data
US 2019/0284102 A1    Sep. 19, 2019

(30) Foreign Application Priority Data

Jul. 18, 2016  (EP) .................................. 16180030

(51) Int. Cl.
| | | |
|---|---|---|
| *C04B 40/00* | (2006.01) | |
| *C04B 14/04* | (2006.01) | |
| *C04B 14/06* | (2006.01) | |
| *C04B 103/14* | (2006.01) | |
| *C04B 103/24* | (2006.01) | |

(52) U.S. Cl.
CPC ........ *C04B 40/0039* (2013.01); *C04B 14/043* (2013.01); *C04B 14/06* (2013.01); *C04B 2103/14* (2013.01); *C04B 2103/24* (2013.01); *Y02W 30/91* (2015.05)

(58) Field of Classification Search
CPC ... C04B 14/06; C04B 14/043; C04B 40/0039; C04B 2103/14; C04B 2103/24; C04B 18/08; C04B 18/141; C04B 20/008; Y02W 30/91; Y02W 30/92; Y02W 30/94
See application file for complete search history.

(56) References Cited

U.S. PATENT DOCUMENTS

| | | | |
|---|---|---|---|
| 5,709,743 A | 1/1998 | Leture et al. | |
| 7,083,672 B2* | 8/2006 | Wagh ..................... | A61K 6/802 106/35 |
| 9,617,185 B2 | 4/2017 | Ferrari et al. | |
| 10,815,128 B2 | 10/2020 | Kumar et al. | |

FOREIGN PATENT DOCUMENTS

| | | | |
|---|---|---|---|
| CN | 104446624 A | * | 3/2015 |
| CN | 105419528 A | * | 3/2016 |
| JP | 2001205047 A | * | 7/2001 |
| WO | 2015/086453 A1 | | 6/2015 |
| WO | WO-2015086453 A1 | * | 6/2015 |

OTHER PUBLICATIONS

International Search Report for PCT/IB2017/054189, dated Nov. 15, 2017, 5 pages.
Written Opinion of the ISA for PCT/IB2017/054189, dated Nov. 15, 2017, 6 pages.
Bräu et al., "Nanostructured Calcium Silicate Hydrate Seeds Accelerate Concrete Hardening: A Combined Assessment of Benefits and Risks", Archives of Toxicology, vol. 86, No. 7, Mar. 31, 2012, pp. 1077-1087.
Examination Report dated Oct. 15, 2020, issued in India Application No. 201817050119, 6 pages.

* cited by examiner

*Primary Examiner* — Anthony J Green
(74) *Attorney, Agent, or Firm* — Nixon & Vanderhye P.C.

(57) ABSTRACT

Provided herein is a composition for use as a hardening regulator, e.g. hardening accelerator or hardening retarder, for building materials, as well as methods for producing thereof. The composition is characterized by a biphasic nature in which solid calcium silicate nanoparticles are dispersed in an aqueous solution comprising inorganic water soluble iron, and possibly zinc, silicate and calcium, species. Additional components such as inorganic ions and silica nanoparticles can be present. Depending on the relative ratio of each component, the composition can be used either for retarding or for accelerating the hardening process of a building material such as cement or concretes. The so-obtained building material further shows an enhanced strength upon compressive forces applied thereon.

21 Claims, No Drawings

HARDENING ACCELERATION/HARDENING RETARDATION COMPOSITION FOR BUILDING MATERIALS

This application is the U.S. national phase of International Application No. PCT/IB2017/054189 filed 12 Jul. 2017 which designated the U.S. and claims priority to EP Patent Application No. 16180030.5 filed 18 Jul. 2016, the entire contents of each of which are hereby incorporated by reference.

TECHNICAL FIELD

The present invention pertains to the field of building materials, and in particular to compositions for use as cement and concrete hardening acceleration, hardening retardation and mechanical strength enhancer, as well as to methods for producing thereof.

BACKGROUND ART

External aiding material (EAM), also known as admixtures, are added in the form of dispersant to aqueous slurries comprising pulverulent organic or inorganic compounds, including clays, silicate compounds, carbon blacks, glass fibers, hydraulic binders or powdered rocks, for improving the workability (i.e. kneadability, spreadability, sprayability, pumpability or flowability) of building materials such as cement or concrete. These EAMs usually help in dispersing the particles formed in a way to improve the fluidity and flowability of a cementitious material. EAMs can be added with a targeted outcomes in particular in building material containing hydraulic binders, such as cement, lime, gypsum, bassanite, anhydrites, fly-ash, pozzolans and furnace slags.

Generally speaking, an excess of water is added in a building material mixture to make it more consistent and workable, said water being also required for the subsequent hydration and hardening steps of the building material. The proportions of cavity (pores) formation in the concrete by the excess water that is evaporated subsequently results in significantly lower mechanical strength and durability of the final material.

In order to reduce the excess of water added to maintain the consistency and workability at the predetermined water/binder ratio, EAMs are added, that are known as water-reducer compositions or super plasticizer or plasticizer. In particular, they can be co-polymers of acid monomers with polyether macro-monomers. According to EN 934-2, concrete admixtures are classified into the following categories: Water reducing/plasticising; High-range water-reducing/super plasticising; Water retaining; Air-entraining; Set accelerating; Hardening accelerating; Set retarding; Water resisting.

Furthermore, EAM for building material mixtures may also contain hardening accelerators that can reduce the setting time of the mixture. According to WO02070425, Calcium silicate hydrates in particular dispersed form can be used for such activities. However, according to WO2010026155, commercially available calcium silicate hydrates or calcium silicate hydrates dispersion may be regarded as hardening accelerator that have very poor effect. Combination with plasticizer can help in improving the desired hardening effect, at the cost of making the system more complex and more carbon intensive, thus less sustainable.

Despite a huge amount of work in the field, it would be desirable to have new building materials and EAMs having improved properties and advantages.

SUMMARY OF INVENTION

In order to overcome the drawbacks of the available external aiding materials in the production of building materials, the inventors developed a brand new composition admixture that can be used at the same time, depending on the needs, as accelerator or retarder of the hardening process of building material mixtures.

One aim of the invention was to find an alternative solution to known EAMs that could better tailor the hardening process depending on several factors, such as the site of construction, the transport of the building material mixtures and the like.

Another aim of the invention was to find an alternative solution to known EAMs that could reduce the environmental impact, such as carbon life cycle and greenhouse gas emissions, upon use thereof in building construction process.

Still another aim of the present invention relies in defining alternative solutions to known EAMs that could be not toxic for the persons involved in a building construction process.

Still another aim of the present invention relies in defining alternative solutions to known EAMs to slim down building construction process by eliminating the need to remove organic components in building materials.

All the above-mentioned aims have been accomplished with the composition of the invention, as described in the present description and in the appended claims.

The inventors surprisingly showed that by using a very specific composition comprising water soluble inorganic compounds, with or without additional inorganic nanoparticles, in specific ratios, a new kind of EAM can be obtained for use both as a hardening acceleration or hardening retarder, eliminating de facto the need of using organic polymers for this purpose. Furthermore, the inventors surprisingly realized that such a composition reduces the permeability and the long-term corrosion of the final building material, such as cement, thus expanding the longevity of the building constructions made therefrom, and more importantly enhance the overall mechanical strength of the building material up to the 30% after about a month, thus allowing a higher loading capacity of the final building material.

Accordingly, it is an object of the present invention to provide for a composition for use as hardening regulator in the manufacturing of building materials, characterized in that it comprises a plurality of solid calcium silicate nanoparticles dispersed into an aqueous solution comprising a water-soluble iron compound and optionally a water-soluble zinc compound.

In a preferred embodiment, the calcium silicate nanoparticles have a mean size comprised between about 10 and 100 nm, preferably between about 30 and 40 nm.

In one embodiment, the aqueous solution comprises traces of a water soluble calcium compound and of a water soluble silicate compound.

In one embodiment, the composition is characterized in that the calcium to silicate ratio in the calcium silicate nanoparticles is comprised between 1 and 10, preferably between 1 and 5, more preferably between 1.6 and 2.25.

In one embodiment, the composition is characterized in that it further comprises aluminium ions and/or magnesium ions and/or copper ions.

In one embodiment, the composition is characterized in that it further comprises iron and/or silica nanoparticles. In a preferred embodiment, said iron and/or silica nanoparticles have a size comprised between 5 nm and 100 micrometer, preferably between 5 nm and 10 micrometer, more preferably between 5 nm and 1 micrometer.

In one embodiment, the composition is characterized in that it has a specific surface area comprised between 100 to 700 $m^2/g$, preferably between 150 to 500 $m^2/g$, more preferably between 150 to 450 $m^2/g$, preferably measured using BET N2 absorption isotherm.

In a preferred embodiment, the composition is characterized in that it comprises less than 5% in weight of organic compounds, preferably no organic compounds at all.

In one embodiment, the composition can also be used as a strength enhancer in the manufacturing of building materials.

In one embodiment, the water soluble calcium compound is selected from the list comprising calcium bromide, calcium carbonate, calcium nitrate, calcium formate, calcium bicarbonate, calcium borate, calcium sulphide, calcium tartrate, di-calcium silicate, tri-calcium silicate, calcium chlorate, calcium iodide, calcium aluminate, calcium phosphate, calcium propionate, calcium oxide, calcium phosphate tribasic, calcium phosphate dibasic dehydrate, calcium phosphate dibasic anhydrous, calcium glycerophosphate, preferably calcium chloride, calcium stearate, calcium gluceptate, calcium gluconate or calcium acetate, or any combination of the foregoing.

In one embodiment, the water soluble silicate compound is selected from the list comprising sodium silicate, calcium silicate, potassium silicate, water glass, di-calcium silicate, tri-calcium silicate, silic acid, sodium metasilicate, potassium metasilicate or any combination thereof.

In one embodiment, the water soluble zinc compound is selected from the list comprising zinc bromide, zinc carbonate, zinc nitrate, zinc formate, zinc bicarbonate, zinc borate, zinc sulphide, zinc tartrate, di-zinc silicate, tri-zinc silicate, zinc chlorate, zinc iodide, zinc aluminate, zinc phosphate, zinc propionate, zinc oxide, zinc phosphate tribasic, zinc phosphate dibasic dehydrate, zinc phosphate dibasic anhydrous, zinc glycerophosphate, preferably zinc acetate, zinc chloride, zinc gluconate, zinc gluceptate or zinc stearate, or any combination of the foregoing.

In one embodiment, the water soluble iron compound is selected from the list comprising iron bromide, iron carbonate, iron nitrate, iron formate, iron bicarbonate, iron borate, iron sulphide, iron tartrate, di-iron silicate, tri-iron silicate, iron chlorate, iron iodide, iron aluminate, iron stearate, iron phosphate, iron propionate, iron oxide, iron phosphate tribasic, iron phosphate dibasic dehydrate, iron phosphate dibasic anhydrous, iron glycerophosphate, preferably iron acetate, iron chloride, iron gluconate, iron gluceptate or iron stearate, or any combination of the foregoing.

Another object of the present invention relates to a process for producing a hardening regulator, possibly used also as a strength enhancer, for use in the manufacturing of building materials, characterized in that it comprises the following step:

a) providing an aqueous solution comprising a water-soluble calcium compound, a water-soluble silicate compound, a water-soluble iron compound and optionally a water-soluble zinc compound, in the presence or in the absence of iron and/or silica nanoparticles;

b) if not present, optionally adding to the solution of a) iron and/or silica nanoparticles; and c) allowing the dispersion and the reaction of the components in a) optionally with the components in b) in a continuous or semi-batch or plug flow or drop wise manner.

In one embodiment, the water soluble calcium compound is selected from the list comprising calcium bromide, calcium carbonate, calcium nitrate, calcium formate, calcium bicarbonate, calcium borate, calcium sulphide, calcium tartrate, di-calcium silicate, tri-calcium silicate, calcium chlorate, calcium iodide, calcium aluminate, calcium phosphate, calcium propionate, calcium oxide, calcium phosphate tribasic, calcium phosphate dibasic dehydrate, calcium phosphate dibasic anhydrous, calcium glycerophosphate, preferably calcium chloride, calcium stearate, calcium gluceptate, calcium gluconate or calcium acetate, or any combination of the foregoing.

In one embodiment, the water soluble silicate compound is selected from the list comprising sodium silicate, calcium silicate, potassium silicate, water glass, di-calcium silicate, tri-calcium silicate, silic acid, sodium metasilicate, potassium metasilicate or any combination thereof.

In one embodiment, the water soluble zinc compound is selected from the list comprising zinc bromide, zinc carbonate, zinc nitrate, zinc formate, zinc bicarbonate, zinc borate, zinc sulphide, zinc tartrate, di-zinc silicate, tri-zinc silicate, zinc chlorate, zinc iodide, zinc aluminate, zinc phosphate, zinc propionate, zinc oxide, zinc phosphate tribasic, zinc phosphate dibasic dehydrate, zinc phosphate dibasic anhydrous, zinc glycerophosphate, preferably zinc acetate, zinc chloride, zinc gluconate, zinc gluceptate or zinc stearate, or any combination of the foregoing.

In one embodiment, the water soluble iron compound is selected from the list comprising iron bromide, iron carbonate, iron nitrate, iron formate, iron bicarbonate, iron borate, iron sulphide, iron tartrate, di-iron silicate, tri-iron silicate, iron chlorate, iron iodide, iron aluminate, iron stearate, iron phosphate, iron propionate, iron oxide, iron phosphate tribasic, iron phosphate dibasic dehydrate, iron phosphate dibasic anhydrous, iron glycerophosphate, preferably iron acetate, iron chloride, iron gluconate, iron gluceptate or iron stearate, or any combination of the foregoing.

In a preferred embodiment, the water soluble compounds are provided in the amounts according to Table 2.

In one embodiment, the process is performed at a temperature comprised between 15° C. and 80° C., preferably between 15° C. and 60° C., more preferably between 15° C. and 40° C.

In one embodiment, the process is performed in alkaline conditions. In a preferred embodiment, the process is performed at a pH comprised between 7 and 14, preferably between 8 and 14, more preferably between 9 and 14.

In one embodiment, the silica nanoparticles are selected from the group consisting of micro silica, quartz, sand, blast furnace and fly ash.

DESCRIPTION OF EMBODIMENTS

The present disclosure may be more readily understood by reference to the following detailed description. It is to be understood that this disclosure is not limited to the specific conditions or parameters described and/or shown herein, and that the terminology used herein is for the purpose of describing particular embodiments by way of example only and is not intended to be limiting of the claimed disclosure.

As used herein and in the appended claims, the singular forms "a", "an" and "the" include plural referents unless the context clearly dictates otherwise. Thus, for example, reference to "a material" may include a plurality of such materials and reference to "a compound" includes reference to one or more compounds, and so forth.

Also, the use of "or" means "and/or" unless stated otherwise. Similarly, "comprise", "comprises", "comprising", "include", "includes" and "including" are interchangeable and not intended to be limiting. It is to be further understood that where descriptions of various embodiments use the term "comprising", those skilled in the art would understand that in some specific instances, an embodiment can be alternatively described using language "consisting essentially of" or "consisting of."

Cement and concrete are the most widely used construction material and are in continuous demand for building homes, bridges, etc. with increasing population. The huge quantity in use contributes to 8-10% of total carbon emission in the world.

The need is to build faster, sustainable and with more strength construction materials with higher longevity. Many additives such as $CaCl_2$ are used in concentration of 2-4% weight based on cement fraction are used for accelerating the setting process to minimize the energy and fasten the process. Unfortunately, the results are an unpredictable premature setting with more than 6% weight usages, and may also lead to corrosion by chloride ions. Several other inorganic accelerator combined with organic polymers are in current use, but seldom influence the overall strength of the concrete. Hence, they are of limited application for faster construction only. Also temperature conditions of the construction place play a vital role.

The object of the present invention overcomes disadvantages related to previous art and substantially provides 3-fold advantage, namely 1) on demand—accelerated or decelerated growth—strength development at versatile curing temperatures 2) enhanced overall mechanical strength—high loading capacity 3) higher longevity—no side corrosive reactions.

The invention will be better understood with the help of the following definitions.

In a main aspect, the present invention provides inorganic compositions that act in particular as hardening accelerator or hardening retarder on demand for use as an EAM in building material mixtures, which furthermore improve the flowability of the final building material. The resulting building material mixture moreover achieves higher strength in either of the compositions. In one aspect, therefore, the invention provides for a mechanical strength enhancer to be used in building material mixtures.

A "building material" is any material which is used for construction purposes. Many naturally occurring substances, such as clay, rocks, sand and wood, even twigs and leaves, are included in this definition. Apart from naturally occurring materials, many man-made products are in use, some more and some less synthetic. The manufacture of building materials is an established industry in many countries and the use of these materials is typically segmented into specific specialty trades, such as carpentry, insulation, plumbing, and roofing work.

In a preferred embodiment according to the invention, the building materials are cements (including cement blends) or concretes. A "cement" is a binder, i.e. a substance used in construction that sets and hardens and can bind other materials together. The most important types of cement are used as a component in the production of mortar in masonry, and of concrete, which is a combination of cement and an aggregate to form a strong building material.

Cements used in construction can be characterized as being either hydraulic or non-hydraulic, depending upon the ability of the cement to set in the presence of water. Non-hydraulic cement will not set in wet conditions or underwater; rather, it sets as it dries and reacts with carbon dioxide in the air. It can be attacked by some aggressive chemicals after setting. Hydraulic cements (e.g., Portland cement) set and become adhesive due to a chemical reaction between the dry ingredients and water. The chemical reaction results in mineral hydrates that are not very water-soluble and so are quite durable in water and safe from chemical attack. This allows setting in wet condition or underwater and further protects the hardened material from chemical attack.

Non-hydraulic cement, such as slaked lime (calcium hydroxide mixed with water), hardens by carbonation in the presence of carbon dioxide which is naturally present in the air. The carbonation reaction requires the dry cement to be exposed to air, and for this reason the slaked lime is a non-hydraulic cement and cannot be used under water. Conversely, hydraulic cement hardens by hydration when water is added. Hydraulic cements are made of a mixture of silicates and oxides, the four main components being Belite ($2CaO \cdot SiO_2$), Alite ($3CaO_2$), both responsible of the mechanical properties of the cement; Tricalcium aluminate or Celite ($3CaO \cdot Al_2O_3$) and Brownmillerite ($4CaO \cdot Al_2O_3 \cdot Fe_2O_3$).

Cement starts to set when mixed with water which causes a series of hydration chemical reactions. The constituents slowly hydrate and the mineral hydrates solidify; the interlocking of the hydrates gives cement its strength. Hydraulic cements do not set by drying out; proper curing requires maintaining the appropriate moisture content during the curing process. If hydraulic cements dry out during curing, the resulting product can be significantly weakened. A "concrete" is a composite material composed of coarse aggregate bonded together with a fluid cement which hardens over time.

The rates of chemical reactions between clinker materials in cements and water, often referred to as cement hydration reactions, may be altered by adding small amounts of chemical substances to the cement-water mix. Substances affecting these rates to give an overall increase in the hydration rate, i.e. an accelerating effect, are termed accelerating admixtures or simply accelerators. Accelerating admixtures affect the rates of reactions between cement and water to give an overall increase in the hydration rate. Thus, the use of accelerators in concrete provides a shortening of setting time and/or an increase in early strength development. Hence, an accelerator is added to concrete for the purpose of shortening setting time and/or increasing early strength development. In the first case the main action of the accelerator occurs in the plastic state of the cement paste, while in the latter case the accelerator acts primarily in the hardened state.

Some accelerators affect either setting or hardening, while several accelerate both setting and hardening. The purposes of using accelerators and the advantages resulting from the use of accelerators are many. The benefits of a reduced setting time may include: earlier finishing of surfaces, reduction of hydraulic pressure on forms and more effective plugging of leaks against hydraulic pressure. The benefits of an increase in the early strength may include: earlier removal of forms, reduction of the required period of curing and protection, earlier placement in service of a structure or a repair and partial or complete compensation for the effects of low temperatures on strength development.

A "set accelerating admixture" is an admixture which decreases the time to commencement of transition of the mix from the plastic to the rigid state. A "hardening accelerating admixture" is an admixture which increases the rate of development of early strength in the concrete, with or without affecting the setting time. Setting is normally determined by measuring the time until a certain mechanical resistance is obtained when a penetration needle is forced into the cement paste (e.g. the Vicat apparatus). A distinction is even made between initial and final setting time. The level of hardening is normally determined by measuring the compressive strength of hardened cement paste, mortar and concrete prisms. Setting and hardening may also be determined indirectly by measuring the heat evolution or temperature increase generated from the chemical reactions between cement and water. The hydration of cement, being an exothermic reaction, produces heat and if the hydration is accelerated, heat is either produced earlier (setting) and/or at a faster rate (hardening).

The rates of cement hydration reactions can be influenced by chemicals added to the cement-water mix. Chemical admixtures affecting these reactions to produce a delay in the process of cement paste stiffening are termed retarding admixtures or simply retarders. Hence, a retarder is added to a concrete mix in order to lengthen setting time and workability time. A "set retarding admixture" is an admixture which extends the time to commencement of transition of the mix from the plastic to the rigid state. An A "hardening retarding admixture" can be defined as an admixture which decreases the rate of development of early strength in the concrete, with or without affecting the setting time.

The hardening accelerator or hardening retarder composition of the invention is formed by reaction of inorganic species with minimal, or preferably without the, addition of organic compounds such as carbon-rich polymers or solvents. The inorganic species used comprise a water-soluble calcium compound, a water-soluble silicate compound and a water-soluble iron compound, optionally by addition of a water-soluble zinc compound, mixed and allowed to react under alkaline conditions in an aqueous solution containing, in some embodiments, traces of inorganic nanoparticles and ions such as aluminium and/or magnesium. An "aqueous solution" is a solution in which the solvent is substantially made of water. In the frame of the present disclosure, the term "aqueous" means pertaining to, related to, similar to, or dissolved in water.

Any water-soluble compound having an adequate solubility/reactivity in water, e.g. a compound for which at least 50% of the solid species can be dissolved in the water as solvent, can be a suitable candidate for any of the above-mentioned species. Said species are preferably provided in the form of nanoparticles having a mean size comprised between about 50 nm and about 1000 micrometers, which are homogeneously dispersed within the final composition.

The final form of the composition of the invention is a biphasic solution in which calcium silicate nanoparticles are dispersed in an aqueous environment comprising a water soluble iron compound and optionally a water soluble zinc compound, with in some embodiments traces of a water soluble calcium compound and of a water soluble silicate compound that did not react to form the calcium silicate nanoparticles. The water soluble zinc compound is present in the composition when this can be used as a hardening accelerator, whereas little to no water soluble zinc compound is present in the composition when this is intended as a hardening retarder.

In fact, it has been astonishingly assessed by the present inventors that the very same composition, depending on the specific ratios of the water soluble compounds dispersed therein, allows it to be used at once as a hardening retarder or as a hardening accelerator. A quick overview of the above-mentioned ratios is given in Table 2. This is one of the main advantages of the composition of the invention; in fact, starting from the very same components, one is allowed to produce EAM additives having opposite effects on building materials. Depending on the acceleration/retarding needs, only the relative amounts of the same compounds should be changed in the composition to have opposed additives, thus reducing for instance the need of buying different additives for different purposes.

In a preferred embodiment, the composition is characterized in that the calcium to silicate ratio in the calcium silicate nanoparticles is comprised between 1 to 10, preferably between 1 to 5, more preferably between 1.6 to 2.25, with spatial measurement at 3 nm. This ratio can be measured by method known in the art such as Inductive couple plasma—Optical Emission Spectroscopy, X-ray Fluorescence and Energy-dispersive X-ray spectroscopy. Solid pure calcium silicate nanoparticles having such a ratio have been experimentally obtained by the inventors for the first time and is one of the main achievements over the prior art compositions. Without being bounded by this theory, it is deemed that the particular three-dimensional, petal-like shape of the highly-pure calcium silicate nanoparticles obtained is one of the main factors for the effectiveness of the present composition as a hardening regulator for building materials. The calcium silicate nanoparticles have a mean size comprised between about 10 and 100 nm, preferably between about 30 and 40 nm.

In one embodiment, the water soluble calcium compound is selected from the list comprising calcium bromide, calcium carbonate, calcium nitrate, calcium formate, calcium bicarbonate, calcium borate, calcium sulphide, calcium tartrate, di-calcium silicate, tri-calcium silicate, calcium chlorate, calcium iodide, calcium aluminate, calcium phosphate, calcium propionate, calcium oxide, calcium phosphate tribasic, calcium phosphate dibasic dehydrate, calcium phosphate dibasic anhydrous, calcium glycerophosphate, preferably calcium chloride, calcium stearate, calcium gluceptate, calcium gluconate or calcium acetate, or any combination of the foregoing.

In one embodiment, the water soluble silicate compound is selected from the list comprising sodium silicate, calcium silicate, potassium silicate, water glass, di-calcium silicate, tri-calcium silicate, silic acid, sodium metasilicate, potassium metasilicate or any combination of the foregoing.

In one embodiment, the water soluble zinc compound is selected from the list comprising zinc bromide, zinc carbonate, zinc nitrate, zinc formate, zinc bicarbonate, zinc borate, zinc sulphide, zinc tartrate, di-zinc silicate, tri-zinc silicate, zinc chlorate, zinc iodide, zinc aluminate, zinc phosphate, zinc propionate, zinc oxide, zinc phosphate tribasic, zinc phosphate dibasic dehydrate, zinc phosphate dibasic anhydrous, zinc glycerophosphate, preferably zinc acetate, zinc chloride, zinc gluconate, zinc gluceptate or zinc stearate or any combination of the foregoing.

In one embodiment, the water soluble iron compound is selected from the list comprising iron bromide, iron carbonate, iron nitrate, iron formate, iron bicarbonate, iron borate, iron sulphide, iron tartrate, di-iron silicate, tri-iron silicate, iron chlorate, iron iodide, iron aluminate, iron stearate, iron phosphate, iron propionate, iron oxide, iron phosphate tribasic, iron phosphate dibasic dehydrate, iron phosphate dibasic anhydrous, iron glycerophosphate, preferably iron acetate, iron chloride, iron gluconate, iron gluceptate or iron stearate, or any combination of the foregoing.

In one embodiment, the composition is characterized in that it further comprises aluminium ions and/or magnesium ions and/or copper ions, even deriving from salts. Salts may preferably be aluminium or magnesium halogens. The inclusion of aluminium and magnesium may introduce the defect in the structure as indicated by WO 2010/026155A1. In some embodiments, ions or salts deriving therefrom can be present in up to 5 wt % of the composition.

In one embodiment, the composition is characterized in that it further comprises iron and/or silica nanoparticles. In a preferred embodiment, said iron and/or silica nanoparticles have a size comprised between 5 nm and 100 micrometer, preferably between 5 nm and 10 micrometer, more preferably between 5 nm and 1 micrometer. The presence of these doping elements in the aqueous solution ensures the defective structure necessary for acceleration or retarder hardening. In some embodiments, iron and/or silica nanoparticles can be present in up to 10 wt % of the composition.

In one embodiment, the composition is characterized in that it has a specific surface area comprised between 100 to 700 $m^2/g$, preferably between 150 to 500 $m^2/g$, more preferably between 150 to 450 $m^2/g$, preferably measured using BET N2 absorption isotherm. The particle size measurement and specific surface can be measured according to the description by A. Aimable and P. Bowen, "Nanopowder metrology and nanoparticle size measurement—Towards the development and testing of protocols" (Processing and Application of Ceramics 4 [3] (2010), pg 157-166). It is preferred that the process of accelerated/decelerated hardening of the cement and concrete is carried out at the site of concrete production (for example a ready-mix concrete, precast concrete plant or any other plant where mortar, concrete or any other cementitious products are produced), and the hardening regulator composition according to the invention is used in the mixing water. The obtained composition is in fact preferably an aqueous solution that can be used directly as the batching water according to the need of the job-site. Mixing water in this context is used in concrete production of similar cementitious materials. In principle the mixing water is mixed with aggregate, cement and other admixture at the pre-cast plant or on the site of construction. In this way, there is no need of separate transportation of EAM or admixtures.

In one embodiment according to the invention, the hardening regulator composition can be added as mixing water or separately. The weight percentage added determines the hardening delay time. Transportation time can be known and accordingly the minimum EAM required can be calculated.

The invention provides an added advantage that it does not contain any added organic molecules and hence does not need any after thermal treatment to remove any organic content. No treatment with basic compound such as calcium hydroxide or alkali based aqueous solution is needed to increase the shelf life of products. No requirement for neutralizing any reaction. The preferred embodiment in this invention is equally compatible with viscosity enhancer organics or any other plasticizer or retarders.

In an implemented embodiment, images were taken using high resolution scanning electron microscopy (HRSEM: Zeiss-Merlin), transmission electron microscopy (TEM: Philips CM 20) and for the hardening accelerator composition particle or hardening retarding composition some high-resolution transmission electron microscopy (HRTEM, Philips CM-300) was carried out. For sample preparation, dilute drops of suspensions were allowed to dry slowly on carbon-coated copper grids. The particle size distributions were evaluated by measuring between 10 and 1000 particles depending on the system. The HRSEM on the silicates were made after drying on a flat substrate (glass slide) after dilution in ultrapure water. The SEMs give information about on the topography in an image mode and the TEMs were used for size distribution and shape characterization in the case of fine particles where the resolution in SEM was not sufficient. The high resolution TEM was used for its resolution that approaches the atomic scale, enabling a study of facets that can hardly be distinguished on classical TEM images.

The use of the composition of the invention not only accelerates or retards the hardening of cements and concrete, but surprisingly also increases the overall mechanical strength of concretes. It improves the quality of settling cement and concrete without any need for higher curing temperature, increasing or keeping the same durability of the cast material. The total strength gain can vary from 300% at early stages and up to 30% at the end of 28 days, depending in a certain way also on the weight % of the added EAM of the invention, as detailed in the Example section for certain implemented embodiments. The retardation effect obtained from the retardation composition can vary from 10 minutes to 18 hours.

The composition of the invention can also contain in some embodiments anti-freeze or shrinkage reducing agents or deformers or similar chemical used in the field of construction chemicals.

The permeability of a building material with respect to water and aqueous solutions is a parameter which has an important influence on the durability of concrete. The measurement of water penetration depth is a good indicator of how a cementitious material can resist to the damages from the surrounding. A decrease of the penetration depth is the consequently an important information about the durability of the concrete. The composition according to the present invention also proved useful for reducing the permeability of a building material such as a concrete. Reduced penetration depth was observed in construction materials when cast with use of hardening accelerator composition or even as hardening retarder composition of the invention.

The hardening accelerator or hardening retarder composition of the invention can also in some embodiments be provided in a solid formulation, preferably in suspension or powder form. The powder product can be obtained from the aqueous composition by for example vacuum filtration or electrostatic sedimentation or sedimentation or spray drying or fluid bed dryer or plug flow wall absorption or freeze-drying.

Provided in the present disclosure is also a process for producing a hardening regulator, i.e. hardening accelerator or retarder, possibly used also as a strength enhancer, for use in the manufacturing of building materials, characterized in that it comprises the following step:

a) providing an aqueous solution comprising a water-soluble calcium compound, a water-soluble silicate compound, a water-soluble iron compound and optionally a water-soluble zinc compound, in the presence or in the absence of iron and/or silica nanoparticles;

b) if not present, optionally adding to the solution of a) iron and/or silica nanoparticles; and c) allowing the dispersion and the reaction of the components in a) optionally with the components in b) in a continuous or semi-batch or plug flow or drop wise manner.

The water soluble compounds are mixed in amounts according to ratios given in Table 2, depending on the need to obtain a hardening retarder or a hardening accelerator, and can be obtained in one embodiment from starting precursors in amounts according to Table 1.

In preferred embodiments, the process is performed without the use of any organic solvents or less than 5% in weight. The temperature range of at which the process is performed in some embodiments is comprised between about 15° C. and about 80° C., preferably between about 15° C. and about 60° C., more preferably between about 15° C. and about 40° C. The pH may depend on the preferred accelerator composition or retarder composition. Preferably, the process is performed in alkaline conditions, at a pH comprised between 7 and 14, preferably between 8 and 14, more preferably between 9 and 14. Pressure is in many embodiments kept at between about 1 atm and about 5 atm, with no effect on the product formation. Higher pressure values can be envisages, that could theoretically speed up the composition formation.

TABLE 1

Preferred relative components' amounts in mol %

| Ca | 0.1 to 11 | Preferably | 0.1 to 9 | More Preferably | 0.1 to 7 |
|---|---|---|---|---|---|
| Zn | 0 to 10 | Preferably | 0 to 6 | More Preferably | 0 to 5 |
| Fe | 0 to 10 | Preferably | 0 to 6 | More Preferably | 0 to 5 |
| Si | 0.1 to 22 | Preferably | 0.1 to 18 | More Preferably | 0.1 to 10 |
| Mg | 0.1 to 2 | Preferably | 0.1 to 1.8 | More Preferably | 0.1 to 1.5 |
| Al | 0.1 to 2 | Preferably | 0.1 to 1.8 | More Preferably | 0.1 to 1.5 |
| Alkali metal | 0.04 to 0.4 | Preferably | 0.04 to 0.18 | More Preferably | 0.04 to 0.16 |
| Alkali earth metal | 0.04 to 0.4 | Preferably | 0.04 to 0.18 | More Preferably | 0.04 to 0.16 |

TABLE 2

Preferred relative components' amounts for accelerator or retarder compositions

| | Water soluble | | |
|---|---|---|---|
| | Calcium compound: Iron compound | Zinc compound: Calcium compound | Silicate compound: Calcium compound |
| Accelerator | Between 1.9 and 3 | Between 0 and 0.8 | Between 1.95 and 3 |

TABLE 2-continued

Preferred relative components' amounts for accelerator or retarder compositions

| | Water soluble | | |
|---|---|---|---|
| | Calcium compound: Iron compound | Zinc compound: Calcium compound | Silicate compound: Calcium compound |
| Retarder | Preferably between 1 and 1.5 Between 0.9 and 2.5 Preferably between 1 and 1.43 | Preferably between 0 and 0.3 Between 1.5 and 2 Preferably between 1.8 and 2 | Between 1.95 and 3 |

EXAMPLES

MORTAR TEST—Compressive & Tensile Strength

Mortar tests are qualitatively representative of the performance in concretes. Mortar test represented shows the comparative efficiencies of the different accelerator compositions or retarder compositions with respect to standard mortar (with no added accelerator composition or retarder composition)

Preparation: The preparation of mortars follows the NORM EN 196-1

The compositions are as following 225 g of water

-450 g of cement

-1350 of normal sand (0/3)

The addition of the accelerator composition or retarder to be tested is expressed as weight percentage of suspension or powder with respect to the cement weight and are indicated in the Table 3 below. The cement used is $C_{42\text{-}05}$ which is CEM I 42.5R with Water/Solid ratio 0.5, from the company HOLCIM AG, a company in Holderberg, Switzerland.

The mortars were cast at water to cement ratio (W/C) 0.5. The total water content is water holding composition of accelerator and mixing water. For comparison purposes, calcium nitrate, a commonly used accelerator is used also. Steel molds were filled with the mortar mix and then were cured at 20° C. The compressive strength and flexural strengths are measured at 6h, 24h, 7 days and 28 days. The accelerator composition is designated as Acc and for retarder composition is designated as Dcc.

TABLE 3

Standard Mortar test results.

| Mix ID | Cement | Acc or Dcc | Compressive Strength [MPa] | | | | Flexural Strength [MPa] | | | |
|---|---|---|---|---|---|---|---|---|---|---|
| | | | 6 h | 24 h | 7 d | 28 d | 6 h | 24 h | 7 d | 28 d |
| 1 | C42_05 | — | 0.4 | 3.6 | 25.8 | 39 | 0 | 2.6 | 6.7 | 10.4 |
| 2 | C42_05 | 1% Ca(NO3)$_2$ | 1 | 5.6 | 24.6 | 38 | 0.21 | 4.6 | 9.5 | 11.6 |
| 3 | C42_05 | 1% Acc | 3.1 | 7.6 | 35 | 39.5 | 1.4 | 7.9 | 14.2 | 16.8 |
| 4 | C42_05 | 4% Acc | 3.9 | 9.1 | 38 | 44 | 4.2 | 10.5 | 16.4 | 19.0 |
| 5 | C42_05 | 8% Acc | 2.9 | 7.1 | 31 | 36 | 3.1 | 6.7 | 13.7 | 16.0 |
| 6 | C42_05 | 1% Dcc | 0.1 | 1.8 | 24 | 41 | 0 | 1.9 | 7.9 | 16.4 |
| 7 | C42_05 | 4% Dcc | 0 | 1.2 | 25 | 40.8 | 0 | 1.2 | 6.8 | 15.9 |
| 8 | C42_05 | 8% Dcc | 0 | 0 | 19 | 42 | 0 | 0.6 | 5.9 | 15.0 |

MORTAR TEST with Supplementary Cementitious Material—Compressive & Tensile Strength The compositions are as following
-225 g of water
-450 g of cement
-1350 of normal sand (0/3)
The addition of the accelerator composition or retarder composition to be tested is expressed as weight percentage of suspension or powder with respect to the cement weight and are indicated in the Table 4 below. The cement used is C42_20FA which is CEM I 42.5R with 20% in weight replacement with fly-ash, from the company HOLCIM AG, a company in Holderberg, Switzerland. The mortars were cast at the water to cement ratio (W/C) 0.5. The total water content is water holding composition of accelerator and mixing water. For comparison purposes, calcium nitrate, a commonly used accelerator is used also. Steel mold were filled with the mortar mix and then were cured at 20° C. The compressive strength and are measured at 6h, 24h, 7 days and 28 days. The accelerator composition is designated as Acc and for retarder composition is designated as Dec. The supplementary cementitious material is fly Ash.

TABLE 4

Standard Mortar test with fly-ash, results.

| | | | Compressive Strength [MPa] | | | |
|---|---|---|---|---|---|---|
| Mix ID | Cement | Acc or Dcc | 6 h | 24 h | 7 d | 28 d |
| 1 | C42_20FA | — | 0.4 | 1.2 | 22.6 | 37.8 |
| 2 | C42_20FA | 1% Ca(NO3)$_2$ | 1 | 3.6 | 22.2 | 36 |
| 3 | C42_20FA | 1% Acc | 5.6 | 8.8 | 27.5 | 41 |
| 4 | C42_20FA | 4% Acc | 6.4 | 9.1 | 29 | 42 |
| 5 | C42_20FA | 8% Acc | 5.1 | 8.6 | 24 | 35 |
| 6 | C42_20FA | 1% Dcc | 0 | 1.2 | 20.4 | 40 |
| 7 | C42_20FA | 4% Dcc | 0 | 0.8 | 16.3 | 9 |
| 8 | C42_20FA | 8% Dcc | 0 | 0 | 13.5 | 38.8 |

Microconcrete Testing

Preparation: The cement used is C42_MC which is CEM I 42.5R from the company HOLCIM AG, a company in Holderberg, Switzerland. The concrete were cast at the water to cement ratio (W/C) 0.5. The total water content is water holding composition of accelerator and mixing water. For comparison purposes, calcium nitrate, a commonly used accelerator is used also. Steel mold were filled with the mortar mix and then were cured at 20° C. The compressive strengths are measured at 6 h, 24 h, 7 days and 28 days.
The compositions are as following
214 g of water
475 g of cement
1067 g of normal sand (⅔)
574 g of Aggregate (⅜)

TABLE 5

| | | | Micro-concrete testing | | | |
|---|---|---|---|---|---|---|
| Mix ID | Micro-concrete | Acc or Dcc | Compressive Strength [MPa] | | | |
| | | | 6 h | 24 h | 7 d | 28 d |
| 1 | C42_MC | — | 0.4 | 3.6 | 28.6 | 41 |
| 2 | C42_MC | 1% Ca(NO3)$_2$ | 1.4 | 4.7 | 31 | 40 |
| 3 | C42_MC | 1% Acc | 4.5 | 5.8 | 35 | 44 |
| 4 | C42_MC | 4% Acc | 6.3 | 9.1 | 37 | 48 |
| 5 | C42_MC | 8% Acc | 4.1 | 5.2 | 33 | 43.8 |
| 6 | C42_MC | 1% Dcc | 0.4 | 2.9 | 23.6 | 46.8 |
| 7 | C42_MC | 4% Dcc | 0.2 | 1.6 | 21.8 | 45.9 |
| 8 | C42_MC | 8% Dcc | 0 | 1.5 | 20.6 | 44.8 |

Measurement of Water Penetration Depth

The measurement of the water depth in the material directly reflects upon the durability of the material. It shows the permeability or the possible aggressive agent penetration accessibility. Non-porous structure ensures high durability of the structure.
Preparation:
Mix 1:
The compositions are as following
225 g of water
450 g of cement
1350 of normal sand (⅔)
Mix 2:
The compositions are as following
225 g of water
450 g of cement
1350 of normal sand (⅔)
18 g or 4% weight Accelerator (Acc)
The water penetration depth measured at difference of 7 days and 28 days maximum shows 4.7 cm for mix 1 and 1.9 cm for mix 2, suggesting much less porous structure with 4% weight Acc, indicating increased durability of the structure. Less porous structure means less vulnerable to elemental attacks such as Chlorine, Sulphate etc.

The invention claimed is:

1. A composition for use as hardening regulator in the manufacturing of building materials, the composition comprising a plurality of solid calcium silicate nanoparticles dispersed into an aqueous solution comprising a water-soluble iron compound, a water-soluble magnesium compound, and a water-soluble zinc compound,
wherein the composition further comprises iron and/or silica nanoparticles.

2. The composition of claim 1, wherein the calcium silicate nanoparticles have a mean size between about 10 and 100 nm.

3. The composition of claim 1, wherein the calcium to silicate ratio in the calcium silicate nanoparticles is between 1 and 10.

4. The composition of claim 1, wherein the composition further comprises aluminium ions and/or magnesium ions and/or copper ions.

5. The composition of claim 1, wherein the iron and/or silica nanoparticles have a size between 5 nm and 100 micrometer.

6. The composition of claim 1, wherein the composition comprises less than 5% in weight of organic compounds.

7. The composition of claim 1, the composition further comprising a water soluble calcium compound, the water soluble calcium compound is selected from the group consisting of calcium bromide, calcium carbonate, calcium nitrate, calcium formate, calcium bicarbonate, calcium borate, calcium sulphide, calcium tartrate, di-calcium silicate, tri-calcium silicate, calcium chlorate, calcium iodide, calcium aluminate, calcium phosphate, calcium propionate, calcium oxide, calcium phosphate tribasic, calcium phosphate dibasic dehydrate, calcium phosphate dibasic anhydrous, calcium glycerophosphate, calcium chloride, calcium stearate, calcium gluceptate, calcium gluconate, calcium acetate, or any combination thereof.

8. The composition of claim 1, the composition further comprising a water soluble silicate compound, the water soluble silicate compound is selected from the group consisting of sodium silicate, calcium silicate, potassium silicate, water glass, di-calcium silicate, tri-calcium silicate, silic acid, sodium metasilicate, potassium metasilicate, or any combination thereof.

9. The composition of claim 1, wherein the water soluble zinc compound is selected from the group consisting of zinc bromide, zinc carbonate, zinc nitrate, zinc formate, zinc bicarbonate, zinc borate, zinc sulphide, zinc tartrate, di-zinc silicate, tri-zinc silicate, zinc chlorate, zinc iodide, zinc aluminate, zinc phosphate, zinc propionate, zinc oxide, zinc phosphate tribasic, zinc phosphate dibasic dehydrate, zinc phosphate dibasic anhydrous, zinc glycerophosphate, zinc acetate, zinc chloride, zinc gluconate, zinc gluceptate, zinc stearate, or any combination thereof.

10. The composition of claim 1, wherein the water soluble iron compound is selected from the group consisting of iron bromide, iron carbonate, iron nitrate, iron formate, iron bicarbonate, iron borate, iron sulphide, iron tartrate, di-iron silicate, tri-iron silicate, iron chlorate, iron iodide, iron aluminate, iron stearate, iron phosphate, iron propionate, iron oxide, iron phosphate tribasic, iron phosphate dibasic dehydrate, iron phosphate dibasic anhydrous, iron glycerophosphate, iron acetate, iron chloride, iron gluconate, iron gluceptate, iron stearate, or any combination thereof.

11. A method for producing a hardening regulator and/or strength enhancer, for use in the manufacturing of building materials, the method comprising the steps of:
providing an aqueous solution comprising a water-soluble calcium compound, a water-soluble silicate compound, a water-soluble iron compound, a water-soluble zinc compound, a water-soluble magnesium compound, and iron nanoparticles and/or silica nanoparticles; and
allowing dispersion and reaction of the aqueous solution in a continuous or semi-batch or plug flow or drop wise manner,
wherein the following ratios are provided between the water-soluble compounds,
a ratio of the water-soluble calcium compound to the water-soluble iron compound between 1.0 and 3,
a ratio of the water-soluble zinc compound to the water-soluble calcium compound between 0 and 0.8, and
a ratio of the water-soluble silicate compound to the water-soluble calcium compound between 1.95 and 3.

12. The method of claim 11, wherein the water soluble calcium compound is selected from the group consisting of calcium bromide, calcium carbonate, calcium nitrate, calcium formate, calcium bicarbonate, calcium borate, calcium sulphide, calcium tartrate, di-calcium silicate, tri-calcium silicate, calcium chlorate, calcium iodide, calcium aluminate, calcium phosphate, calcium propionate, calcium oxide, calcium phosphate tribasic, calcium phosphate dibasic dehydrate, calcium phosphate dibasic anhydrous, calcium glycerophosphate, calcium chloride, calcium stearate, calcium gluceptate, calcium gluconate, calcium acetate, or any combination thereof.

13. The method of claim 11, wherein the water soluble silicate compound is selected from the group consisting of sodium silicate, calcium silicate, potassium silicate, water glass, di-calcium silicate, tri-calcium silicate, silic acid, sodium metasilicate, potassium metasilicate, or any combination thereof.

14. The method of claim 11, wherein the water soluble zinc compound is selected from the group consisting of zinc bromide, zinc carbonate, zinc nitrate, zinc formate, zinc bicarbonate, zinc borate, zinc sulphide, zinc tartrate, di-zinc silicate, tri-zinc silicate, zinc chlorate, zinc iodide, zinc aluminate, zinc phosphate, zinc propionate, zinc oxide, zinc phosphate tribasic, zinc phosphate dibasic dehydrate, zinc phosphate dibasic anhydrous, zinc glycerophosphate, zinc acetate, zinc chloride, zinc gluconate, zinc gluceptate, zinc stearate, or any combination thereof.

15. The method of claim 11, wherein the water soluble iron compound is selected from the group consisting of iron bromide, iron carbonate, iron nitrate, iron formate, iron bicarbonate, iron borate, iron sulphide, iron tartrate, di-iron silicate, tri-iron silicate, iron chlorate, iron iodide, iron aluminate, iron stearate, iron phosphate, iron propionate, iron oxide, iron phosphate tribasic, iron phosphate dibasic dehydrate, iron phosphate dibasic anhydrous, iron glycerophosphate, iron acetate, iron chloride, iron gluconate, iron gluceptate, iron stearate, or any combination thereof.

16. The method of claim 11, wherein the reaction is performed at a temperature between 15° C. and 80° C.

17. The method of claim 11, wherein the reaction is performed at a pH between 7 and 14.

18. The method of claim 11, wherein in the step of providing, the aqueous solution further comprises a water-soluble zinc compound.

19. The method of claim 11, wherein the iron nanoparticles and/or silica nanoparticles are added to the aqueous solution after providing the aqueous solution having the water-soluble calcium compound, the water-soluble silicate compound, the water-soluble iron compound, and the water-soluble zinc compound.

20. A composition for use as hardening regulator in the manufacturing of building materials, the composition comprising a plurality of solid calcium silicate nanoparticles dispersed into an aqueous solution comprising a water-soluble iron compound and a water-soluble zinc compound, the composition being free of organic compounds.

21. A method for producing a hardening regulator and/or strength enhancer, for use in the manufacturing of building materials, the method comprising the steps of:
providing an aqueous solution comprising a water-soluble calcium compound, a water-soluble silicate compound, a water-soluble iron compound, a water-soluble zinc compound, a water soluble magnesium compound, and iron nanoparticles and/or silica nanoparticles; and
allowing dispersion and reaction of the aqueous solution in a continuous or semi-batch or plug flow or drop wise manner,
wherein the following ratios are provided between the water-soluble compounds,
a ratio of the water-soluble calcium compound to the water-soluble iron compound between 0.9 and 2.5,
a ratio of the water-soluble zinc compound to the water-soluble calcium compound between 1.5 and 2, and a ratio of the water-soluble silicate compound to the water-soluble calcium compound between 1.95 and 3.

* * * * *